US008954182B2

(12) United States Patent
Okamoto et al.

(10) Patent No.: US 8,954,182 B2
(45) Date of Patent: Feb. 10, 2015

(54) ROBOT SYSTEM

(75) Inventors: Takeshi Okamoto, Kitakyushu (JP); Kenji Matsufuji, Kitakyushu (JP); Takurou Yano, Fukuoka (JP); Takuya Murayama, Kitakyushu (JP); Yoshihisa Nagano, Kitakyushu (JP)

(73) Assignee: Kabushiki Kaisha Yaskawa Denki, Fukuoka (JP)

(*) Notice: Subject to any disclaimer, the term of this patent is extended or adjusted under 35 U.S.C. 154(b) by 428 days.

(21) Appl. No.: 13/221,013

(22) Filed: Aug. 30, 2011

(65) Prior Publication Data

US 2012/0053724 A1     Mar. 1, 2012

(30) Foreign Application Priority Data

Aug. 31, 2010 (JP) ................................ 2010-194559

(51) Int. Cl.
 *G06F 19/00* (2011.01)
 *B25J 9/16* (2006.01)

(52) U.S. Cl.
 CPC .............. *B25J 9/1697* (2013.01); *B25J 9/1682* (2013.01); *G05B 2219/40053* (2013.01); *G05B 2219/39109* (2013.01); *Y10S 901/30* (2013.01)
 USPC .............................. 700/112; 700/245; 901/30

(58) Field of Classification Search
 CPC .................... B25J 9/1682; G05B 2219/40053; G05B 2219/39109
 USPC .................. 700/96, 111, 112, 114, 245–264; 901/30
 See application file for complete search history.

(56) References Cited

U.S. PATENT DOCUMENTS

| 4,187,051 A | * | 2/1980 | Kirsch et al. | ............... 414/744.3 |
| 4,305,130 A | * | 12/1981 | Kelley et al. | .................. 700/259 |
| 4,640,655 A | * | 2/1987 | Jacobsen | .................... 414/796.2 |

(Continued)

FOREIGN PATENT DOCUMENTS

| EP | 1043642 | 10/2000 |
| EP | 1 413 404 A2 | 4/2004 |

(Continued)

OTHER PUBLICATIONS

European Search Report dated Apr. 3, 2014 issued in corresponding European application No. 11179416.0.

(Continued)

*Primary Examiner* — Sean Shechtman
*Assistant Examiner* — Chad Rapp
(74) *Attorney, Agent, or Firm* — Bacon & Thomas, PLLC

(57) ABSTRACT

A robot system includes a manipulator; a work table arranged within a movement extent of the manipulator; an imaging unit for taking a two-dimensional image of the workpieces loaded on the work table; a workpiece supply unit for supplying workpieces onto the work table; and a control system for controlling operations of the manipulator and the imaging unit. The control system includes an imaging control unit for controlling the imaging unit to take the two-dimensional image of the workpieces loaded on the work table, a workpiece detecting unit for detecting a position and a posture of each of the workpieces loaded on the work table by comparing the two-dimensional image taken by the imaging unit with templates stored in advance, and a manipulator control unit for operating the manipulator to perform a work with respect to the workpieces detected by the workpiece detecting unit.

16 Claims, 12 Drawing Sheets

(56) References Cited

U.S. PATENT DOCUMENTS 5,211,528 A * 5/1993 Kato .......................... 414/789.6
5,419,457 A * 5/1995 Ross et al. .................... 209/616
5,446,835 A    8/1995 Iida et al.

FOREIGN PATENT DOCUMENTS

| GB | 2115779 A | * | 9/1983 |
|----|-----------|---|--------|
| JP | 2555822 | | 9/1996 |
| JP | 1997-108957 A | | 4/1997 |
| JP | 2000-288974 A | | 10/2000 |
| WO | WO2008/011970 | * | 1/2008 |

OTHER PUBLICATIONS

Office Action dated Aug. 23, 2013 issued in corresponding Japanese application No. 2010-194559 (w/English translation thereof).
Korean Office Action dated Sep. 18, 2014 issued in corresponding Korean application No. 10-2011-0088173 and the English translation thereof.

* cited by examiner

US 8,954,182 B2

ROBOT SYSTEM

CROSS-REFERENCE TO RELATED APPLICATION

The present application claims priority to Japanese Patent Application No. 2010-194559, filed Aug. 31, 2010. The contents of the application are incorporated herein by reference in its entirety.

FIELD OF THE INVENTION

The present invention relates to a robot system.

BACKGROUND OF THE INVENTION

It is known a picking system for finding edge lines of a pile of parts from a two-dimensional image, extracting a plurality of component line segments from the edge lines, recognizing a part from the component line segments and causing a robot arm to grip the part thus recognized (see, e.g., Japanese Patent No. 2555822).

SUMMARY OF THE INVENTION

In accordance with the present invention, there is provided a robot system, comprising: a manipulator; a work table arranged within a movement extent of the manipulator; an imaging unit for taking a two-dimensional image of workpieces loaded on the work table; a workpiece supply unit for supplying the workpieces onto the work table; and a control system for controlling operations of the manipulator and the imaging unit.

The control system includes an imaging control unit for controlling the imaging unit to take the two-dimensional image of the workpieces loaded on the work table when the workpieces are supplied onto the work table by the workpiece supply unit, a workpiece detecting unit for detecting a position and a posture of each of the workpieces loaded on the work table by comparing the two-dimensional image taken by the imaging unit with templates stored in advance, and a manipulator control unit for operating the manipulator to perform a work with respect to the workpieces detected by the workpiece detecting unit.

BRIEF DESCRIPTION OF THE DRAWINGS

FIG. 10 is a flowchart illustrating major operations of the bolt picking method (step S3) performed by the picking system.

DETAILED DESCRIPTION OF THE PREFERRED EMBODIMENTS

For the sake of understanding of the present invention, one embodiment of the present invention will now be described with reference to the accompanying drawings. In the respective drawings, it is sometimes the case that those portions having nothing to do with the description are not illustrated.

Figure 1:
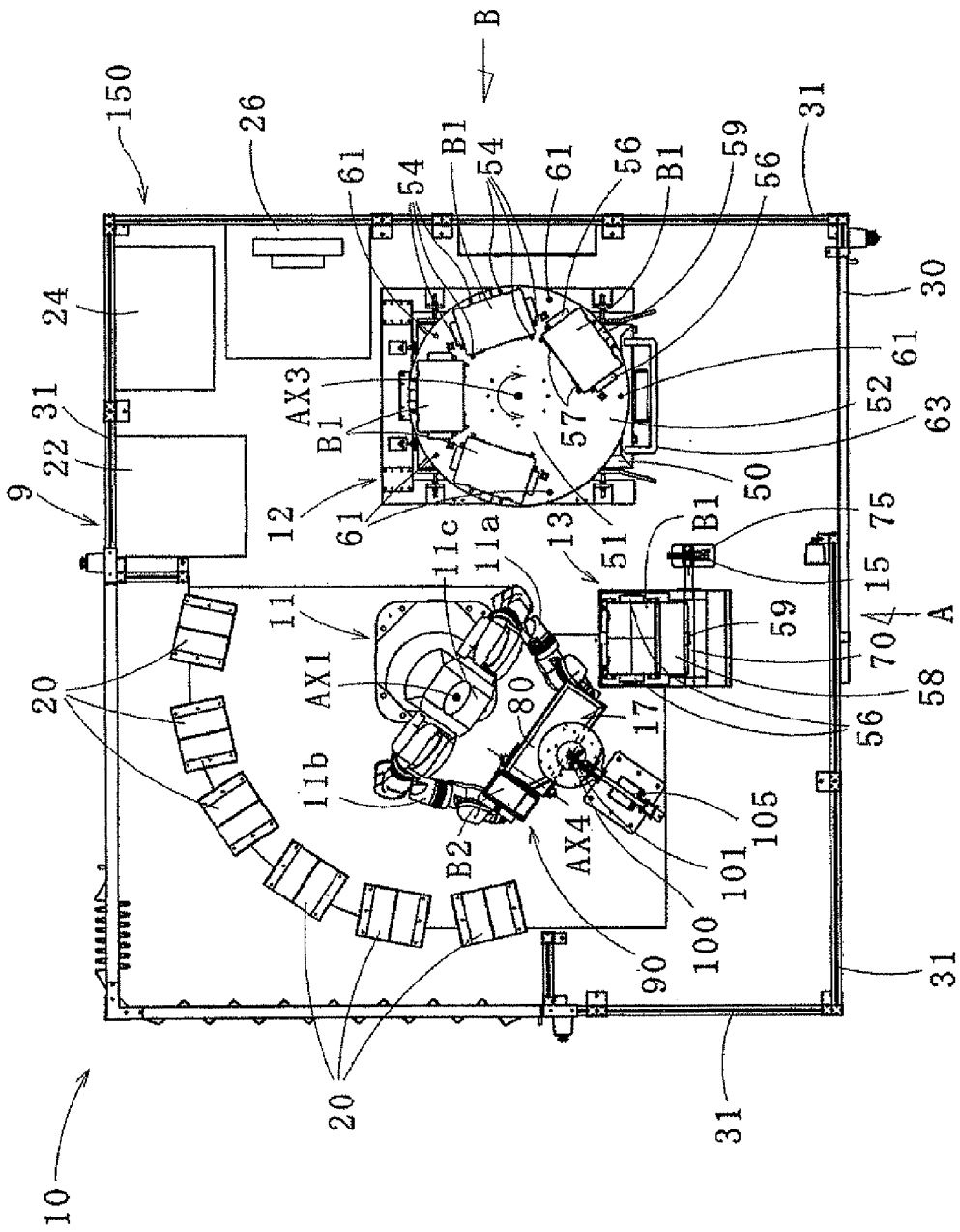
FIG. 1 is a plan view showing a picking system (robot system) according to one embodiment of the present invention.

Referring to FIG. 1, a part picking system(robot system) according to the embodiment includes a work device 9, an assortment table 13, a raking tool 15 and a plurality of workpiece racks 20. The work device 9 includes a double-arm manipulator (one example of a manipulator and a workpiece supply unit) 11, a work table 17, a two-dimensional camera (one example of an imaging unit) 100 and a control system 150. The control system 150 includes a robot controller 22, a system controller 24 and an image processing computer 26. While the control system 150 of the present embodiment includes three individual operation units, i.e., the robot controller 22, the system controller 24 and the image processing computer 26, the number of the operation units making up the control system 150 may be arbitrarily changed.

The assortment table 13, the work table 17 and the workpiece racks 20 are arranged clockwise (along the circumferential direction of a circle) in the named order about the double-arm manipulator 11. In particular, it is desirable that the respective workpiece racks 20 be arranged substantially on the same circle having, as central axis thereof, a swivel axis (an axis orthogonal to the installation surface of the double-arm manipulator 11) AX1 of a body 11c of the double-arm manipulator 11. By arranging the assortment table 13, the work table 17 and the workpiece racks 20 in this manner, it is possible to shorten a motion path of the double-arm manipulator 11 and to efficiently operate the double-arm manipulator 11.

Figure 2:
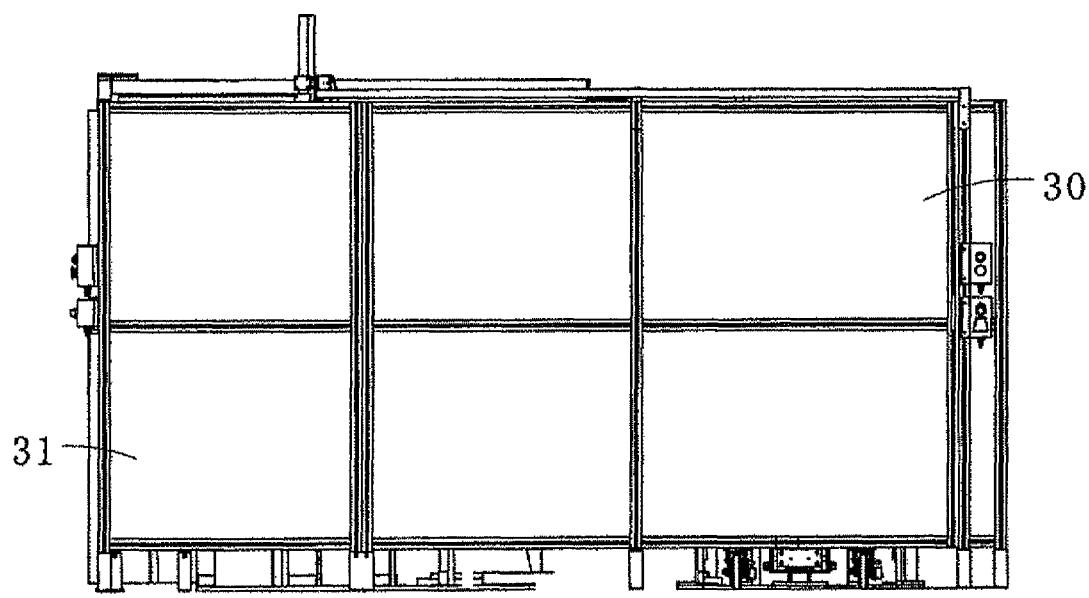
FIG. 2 is a front view of the picking system as seen in the direction of arrow A in FIG. 1.
Figure 3:
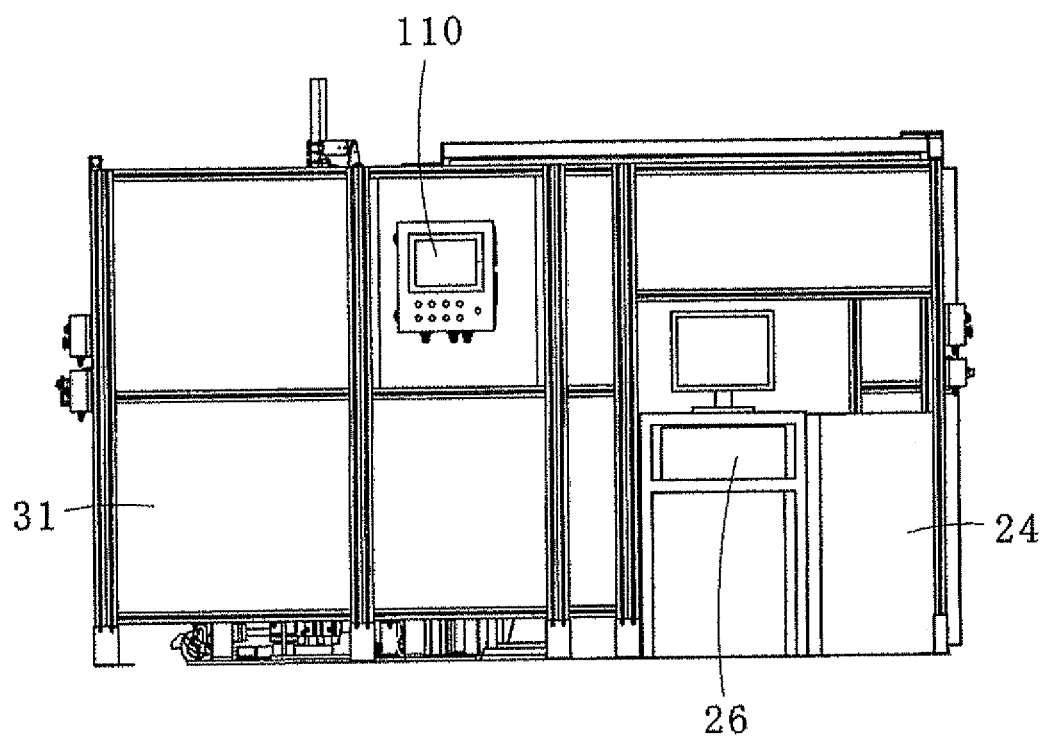
FIG. 3 is a side view of the picking system as seen in the direction of arrow B in FIG. 1.

Using the double-arm manipulator 11, the picking system 10 is capable of taking out a required number of specific bolts (one example of workpiece s) from the workpiece racks 20 and bringing them into assortment boxes B1 loaded on a conveying carriage 12. As shown in FIG. 1 through 3, the picking system 10 is surrounded by a protective wall 31 having a sliding door 30 arranged in a gateway.

The double-arm manipulator 11 includes a left arm (one example of a first arm) 11a and a right arm (one example of a second arm) 11b, both of which are arranged at the left and right sides of the swiveling body 11c. Each of the left arm 11a and the right arm 11b is a multi-joint manipulator having, e.g., seven joint axes.

Figure 4:
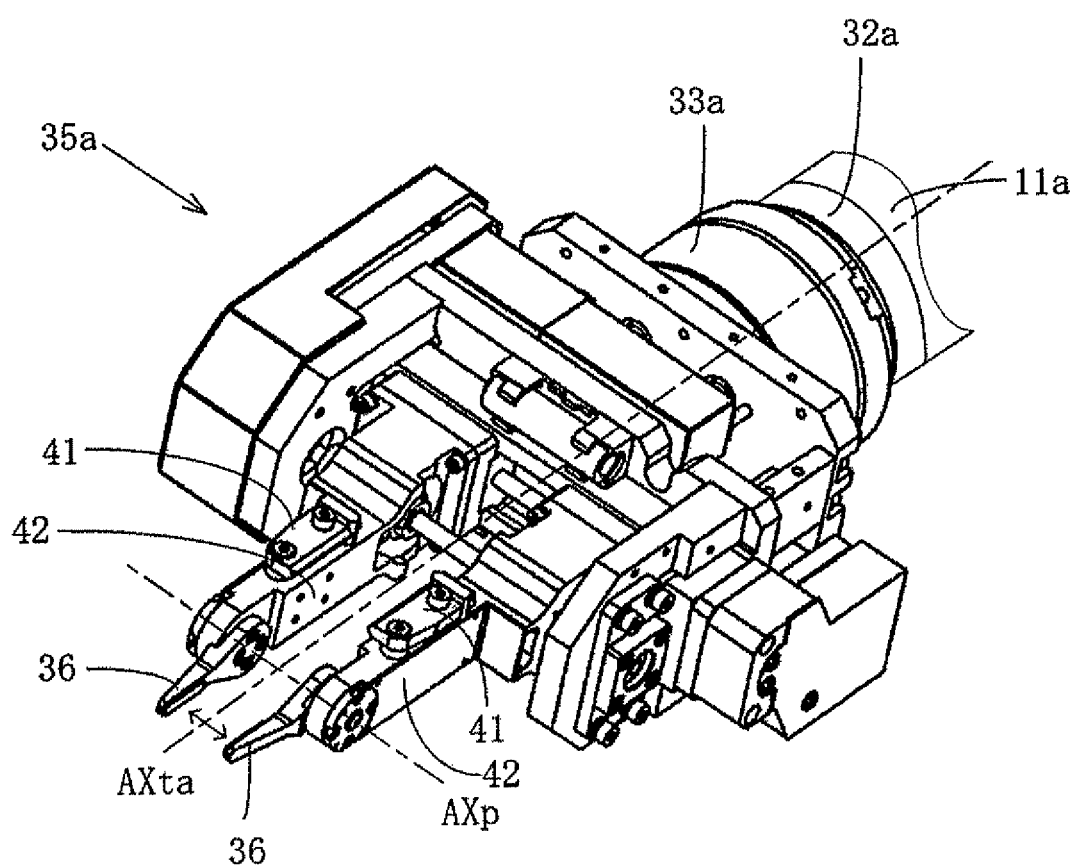
FIG. 4 is a perspective view showing a left hand of a double-arm manipulator employed in the picking system.

As shown in FIG. 4, the left arm 11a has a wrist flange 32a at a leading end thereof, and a left hand (one example of a first hand) 35a is coupled to the wrist flange 32a through a left force sensor (one example of a first force sensor) 33a. The left hand 35a includes a pair of gripping claws (one example of a first gripping unit) 36 for gripping each of the bolts and a pair of tool holding members 41 for holding the raking tool 15 to be set forth later. The gripping claws 36 are rotatable about a picking axis AXp orthogonal to a rotation axis AXta of the wrist flange 32a and therefore capable of changing the orientation of the tip end portions thereof. The gripping claws 36 can be moved toward and away from each other along the picking axis AXp. The gripping claws 36 are driven by a servo motor (not shown) so that the bolt gripping force thereof can be controlled. The tool holding members 41 are provided in the support portions 42 for supporting the gripping claws 36. This means that the tool holding members 41 are moved toward and away from each other in concert with that of the gripping claws 36.

Figure 5:
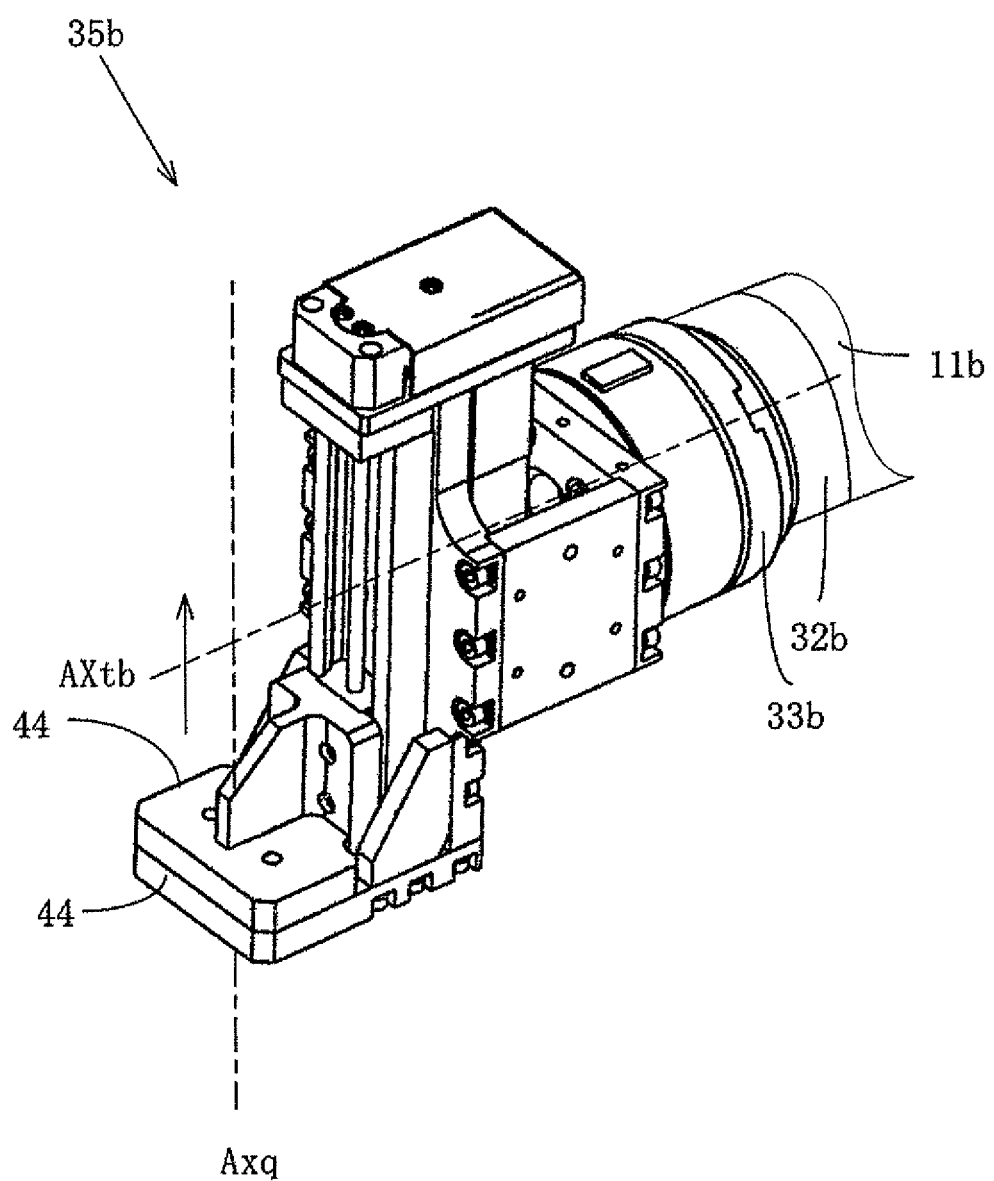
FIG. 5 is a perspective view showing a right hand of the double-arm manipulator employed in the picking system.

Referring to FIG. 5, the right arm 11b has a wrist flange 32b at a leading end thereof, and a right hand (one example of a second hand) 35b is coupled to the wrist flange 32b through a right force sensor (one example of a second force sensor) 33b. The right hand 35b is capable of gripping a workpiece box B2 having the bolts therein. The right hand 35b includes lower and upper gripping claws (one example of a second gripping unit) 44 for gripping the rear portion of the workpiece box B2 vertically interposed therebetween. The lower gripping claw 44 is configured to support a bottom surface of the workpiece box B2. The upper gripping claw 44 is configured to move toward and away from the lower gripping claw 44 along an opening/closing axis AXq orthogonal to a rotation axis AXtb of the wrist flange 32b. The upper gripping claw 44 is moved to contact with the lower gripping claw 44 in FIG. 5. The left force sensor 33a and the right force sensor 33b are connected to the system controller 24 through the robot controller 22.

Description will now be given on the conveying carriage 12. The conveying carriage 12 is capable of conveying the assortment boxes B1 for receiving the bolts gripped by the double-arm manipulator 11. The conveying carriage 12 includes a carriage frame 50 and a rotary table supported by the carriage frame 50, the rotary table being capable of rotating about a vertical axis AX3.

Casters (not shown) are attached to the lower portion of the carriage frame 50. An angle calculation unit (not shown) for calculating the rotation angle of the rotary table 51 and a fixing unit (not shown) for fixing the rotary table 51 at a specified angular position are provided in the carriage frame 50.

The rotary table 51 includes a circular top plate 52 capable of supporting a plurality of assortment boxes B1 arranged at, e.g., five places, along the circumference thereof. The horizontal positions of the assortment boxes B1 are determined by a plurality of guide poles 54 extending upwards from the top plate 52. The assortment boxes B1 may be stacked one above another up to, e.g., ten stories.

Each of the assortment boxes B1 is divided into a plurality of compartments (e.g., four compartments like the assortment box B1 loaded onto the assortment table 13) and is provided with handles 56 on the left and right side surfaces thereof. Each of the assortment boxes B1 includes an upwardly openable lid 58 pivotably held by a hinge 57 provided on the rear surface thereof. The lid 58 is provided with forwardly protruding knob 59. The assortment boxes B1 are made of, e.g., resin. Different kinds of bolts are accommodated within the respective compartments of each of the assortment boxes B1.

Attached to the rear surface of each of the assortment boxes B1 is a two-dimensional barcode (one example of an information storage medium) for storing at least first matching information in which each compartment of the assortment box B1 is matched with the corresponding kind (e.g., the diameter, length and material) and the number of the bolts to be put into the corresponding compartment. The two-dimensional barcode may be substituted by a one-dimensional barcode. Since the two-dimensional barcode storing the first matching information is directly attached to each of the assortment boxes B1, the correspondence between the assortment boxes B1 and the bolts to be put into the assortment boxes B1 becomes clear.

The top plate 52 is provided with a plurality of upwardly-extending handle bars 61. The double-arm manipulator 11 can rotate the rotary table 51 about the vertical axis AX3 by gripping the handle bars 61 with the support portions 42 of the left hand 35a.

The conveying carriage 12 is provided with a bar 63 so that a worker can hold the bar 63 and move the conveying carriage 12. The conveying carriage 12 loaded with the assortment boxes B1 is carried in and out by the worker through the gateway provided with the sliding door 30. If the conveying carriage 12 is carried into a specified position, it is lifted up by an air cylinder (not shown) and, consequently, fixed in place with the casters kept spaced apart from the floor.

The assortment table 13 is a table for holding one of the assortment boxes B1 unloaded from the conveying carriage 12 by the double-arm manipulator 11. The bolts taken out from the workpiece box B2 on each of the workpiece racks 20 by the double-arm manipulator 11 are transferred to the assortment box B1 placed on the assortment table 13 (one example of a work).

Provided in the assortment table 13 are a load sensor (not shown) for detecting the assortment box B1 placed on the assortment table 13, an opening/closing detection sensor (not shown) for detecting the opening and closing states of the lid 58 of the assortment box B1 placed on the assortment table 13 and a barcode reader (not shown) for reading the two-dimensional barcode attached to the assortment box B1. The load sensor, the opening/closing detection sensor and the barcode reader are connected to the system controller 24. The assortment table 13 is provided with a support member 70 for supporting the lid 58 of the assortment box B1.

Figure 7:
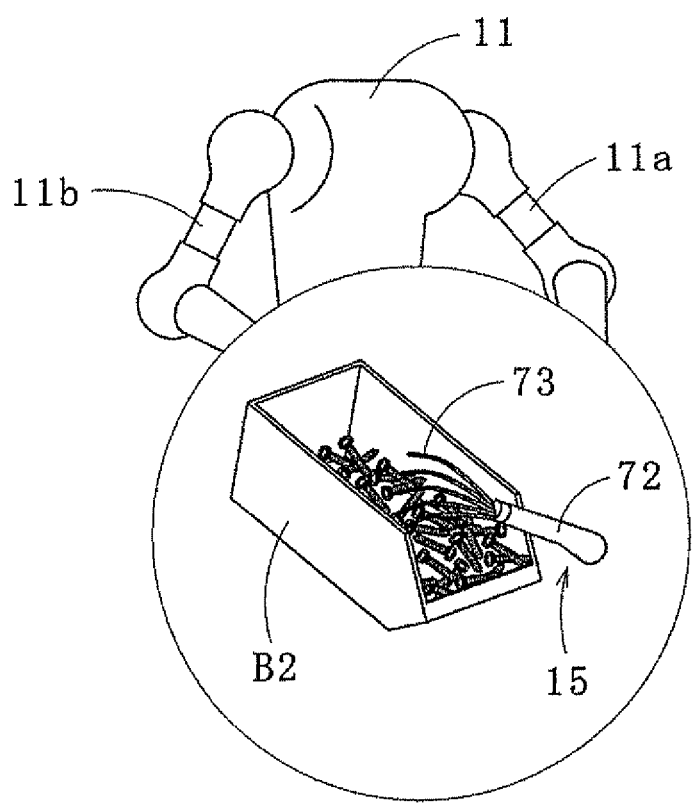
FIG. 7 is an explanatory view depicting a situation in which bolts are raked out by the double-arm manipulator of the picking system.

Referring to FIG. 7, the raking tool 15 is a tool used for the double-arm manipulator 11 to rake out the bolts from the workpiece box B2 onto the work table 17. The raking tool 15 includes a handle 72 and a plurality of raking forks 73 provided at the tip end of the handle 72. The raking forks 73 are formed of a plurality of metal prongs extending from the proximal ends toward the distal ends in a curved shape. An adapter (not shown) for enabling the tool holder 41 of the left hand 35a to hold the raking tool 15 is attached to the handle 72. The raking tool 15 is placed on a stand 75.

The work table 17 is a table arranged within the movement extent of the double-arm manipulator 11 so that the double-arm manipulator 11 can grip the bolts raked out from the workpiece box B2.

The work table 17 includes a tiltable plate 80 for receiving the raked-out bolts and a workpiece box stand 90 for temporarily supporting the workpiece box B2. The tiltable plate 80 is formed of, e.g., a rectangular plate. The tiltable plate 80 is pivotable about a rotation axis AX4 that extends substantially horizontal the ground and orthogonal to the longitudinal direction of the tiltable plate 80 at one end portion of the tiltable plate 80. The workpiece box stand 90 is arranged next to a side of the tiltable plate 80 where the rotation axis AKA exists.

If the other end portion of the tiltable plate 80 is lifted up by the double-arm manipulator 11, the tiltable plate 80 is tilted about the rotation axis AX4 so that the bolts on the tiltable plate 80 can be brought back to the workpiece box B2 temporarily placed on the workpiece box stand 90. The workpiece box stand 90 is provided with a load sensor (not shown) for detecting the workpiece box B2 placed thereon.

A two-dimensional camera 100 is provided above the tiltable plate 80 to take a two-dimensional image of the bolts placed on the work table 17. The two-dimensional camera 100 may be, e.g., a two-dimensional monochromatic camera with 4 million pixels. The two-dimensional camera 100 is supported by a stand 105 in a height-adjustable manner. An illumination device 101 for securing illuminance required for the two-dimensional camera 100 to take an image is provided in the stand 105.

The two-dimensional camera 100 is connected to the image processing computer 26. The image taken by the two-dimensional camera 100 is transmitted to the image processing computer 26. The two-dimensional camera 100 is also connected to the system controller 24 so that the imaging operation of the two-dimensional camera 100 can be controlled by the system controller 24. In other words, the system controller 24 is configured to serve as an imaging control unit for controlling the two-dimensional camera 100.

The workpiece racks 20 are racks for storing a plurality of workpiece boxes B2. Each of the workpiece racks 20 is divided into a plurality of compartments in vertical and transverse directions and is opened in a front-rear direction. This enables the double-arm manipulator 11 to take out the workpiece box 32 at the front side of each of the workpiece racks 20 while allowing the worker to take out the workpiece box 32 at the rear side of each of the workpiece racks 20.

Figure 6:
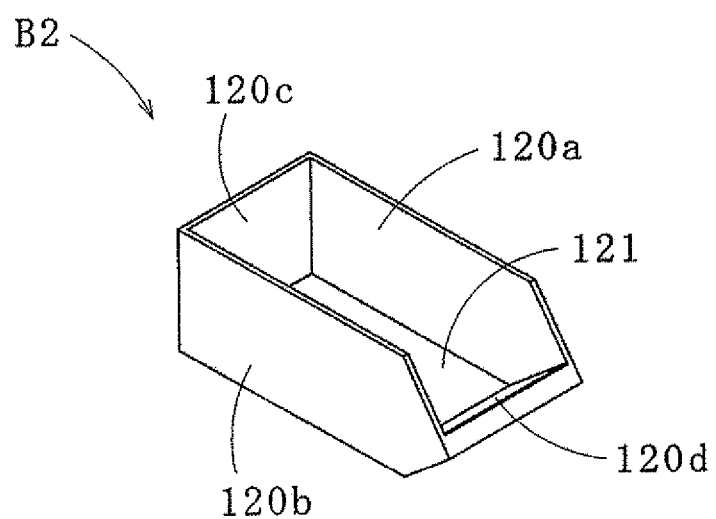
FIG. 6 is a perspective view illustrating a box used in the picking system.

Referring to FIG. 6, the workpiece box 32 includes a rectangular bottom plate 121, left and right side plates 120a and 120b extending upwards from the left and right edges of the bottom plate 121, a rear plate 120c extending upwards from the rear edge of the bottom plate 121 and a front plate 120d obliquely extending forwards from the front edge of the bottom plate 121. The height of the front plate 120d measured from the front edge of the bottom plate 121 to the tip end of the front plate 120d is shorter than the height of the left and right side plates 120a and 120b and the rear plate 120c. In other words, the workpiece box B2 is opened at the top end and the front upper side thereof. As will be described in detail, the bolts are raked out from the front side of the workpiece box B2 by the double-arm manipulator 11.

Each of the workpiece racks 20 is divided into, e.g., two-row five-story compartments. workplace boxes B2 holding different kinds of bolts are stored in the respective compartments. In case where each of the workpiece racks 20 has two-row five-story compartments as mentioned above, the picking system 10 including six workpiece racks 20 can store sixty kinds of bolts in total.

The workpiece boxes B2 are stored so that the rear surface of each of the workpiece boxes B2 can face the double-arm manipulator 11 with the front surface thereof facing toward the outside of the workpiece picking system 10. The system controller 24 stores in advance second matching information indicating the kinds of bolts of the workpiece boxes B2 stored in the respective compartments.

The sequence of storing the second matching information in the system controller 24 will now be described in detail.

As one of tasks for storing the second matching information, operation teaching data of the double-arm manipulator 11 containing the positions of the respective compartments are stored in the robot controller 22.

A barcode (or a two-dimensional barcode) containing the information on the kinds of bolts is attached to each of the workpiece boxes B2 stored in the workpiece racks 20. The double-arm manipulator 11 causes the barcode reader provided in the assortment table 13 to read the barcode of each of the workpiece boxes B2. Pursuant to the operation teaching data, the double-arm manipulator 11 stores the workpiece boxes B2 within the respective compartments of the workpiece racks 20. At this time, the information on the barcodes allotted to the workpiece boxes 52 (the information indicating at least the kinds of bolts) is matched with each of the compartments and is stored in the system controller 24 as the second matching information.

At the rear side of each of the workpiece racks 20 and alongside the respective compartments, there is provided a lamp (not shown) for indicating that the number of bolts contained in each of the workpiece boxes 52 is smaller than a predetermined number. If the lamp is turned on, the worker may take out the workpiece box B2 at issue from the rear side of each of the workpiece racks 20 and may supplement the workpiece box B2 with new bolts.

The robot controller 22 is provided as one example of a manipulator control unit. The robot controller 22 is connected to the double-arm manipulator 11 to control the operation of the double-arm manipulator 11.

The system controller 24 is connected to the robot controller 22 to control the overall operation of the picking system 10. In particular, the system controller 24 can control the on/off operations of the lamps set forth above.

The worker can operate the system controller 24 through the use of a touch panel 110 (see FIG. 3). The system controller 24 includes, e.g., a programmable logic controller.

The image processing computer 26 is provided as one example of a workpiece detector unit. The image processing computer 26 is connected to the two-dimensional camera 100 and the system controller 24 and is essentially capable of processing the images taken by the two-dimensional camera 100.

Figure 9:
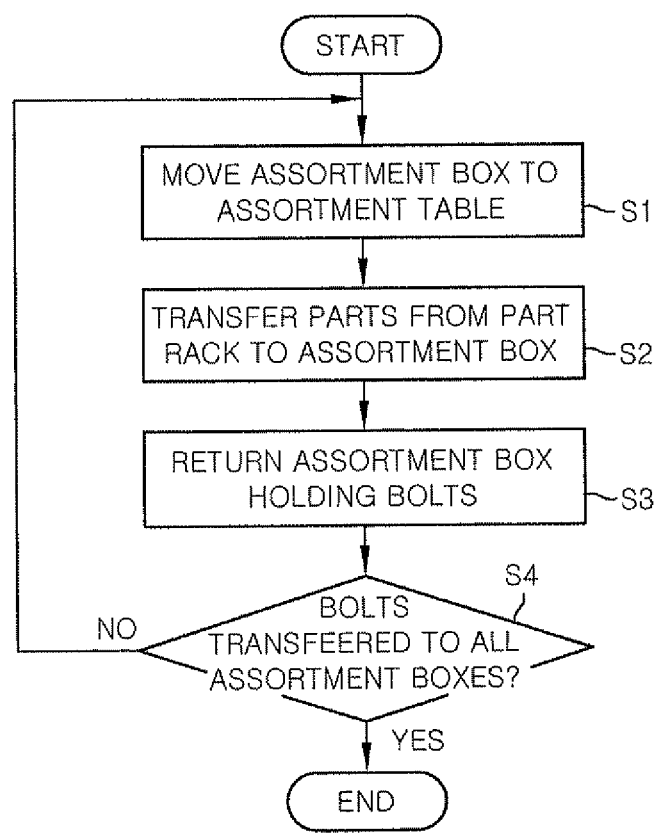
FIG. 9 is a flowchart illustrating a bolt picking method (steps S1 to S4) performed by the picking system.

Next, description will be given on a bolt picking method performed by the picking system 10. Referring to FIG. 9, the bolt picking method is largely composed of steps S1 through S4. In step S1, the double-arm manipulator 11 brings one of the assortment boxes B1 from the conveying carriage 12 to the assortment table 13. In step S2, the double-arm manipulator 11 transfers the bolts from each of the workpiece racks 20 to the assortment box B1. In step S3, the double-arm manipulator 11 returns the assortment box B1 containing the bolts to the conveying carriage 12. In step S4, determination is made as to whether to stop the operations. Steps S1 through S4 will now be described one by one.

(Advance Preparation)

The worker brings the conveying carriage 12 loaded with empty assortment boxes 81 into the work device 9 through the gateway. As mentioned above, the assortment boxes B1 can be placed, e.g., in five rows, on the top plate of the conveying carriage 12 along the circumference thereof. A predetermined number of assortment boxes B1 are stacked one above another in each of the rows. As can be seen in FIG. 1, at least one of the rows (the place for arrangement of the assortment boxes 81 in one row) is kept empty so that the assortment box B1 containing the bolts can be returned to the empty row. The conveying carriage 12 brought into the work device 9 is lifted up by an air cylinder (not shown) and fixed in place. The worker operates the touch panel 110 (see FIG. 3) to start up the picking system 10.

(Step S1)

Figure 10:
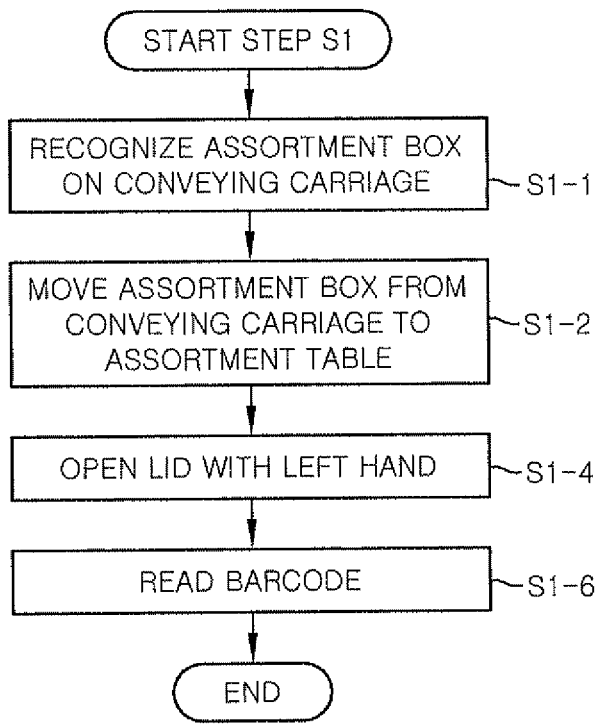
FIG. 10 is a flowchart illustrating major operations of the bolt picking method (step S1) performed by the king system.

First, step S1 in which one of the assortment boxes 81 is moved to the assortment table 13 by the double-arm manipulator 11 will be described with reference to FIG. 10 which illustrates only major operations.

(Step S1-1)

After the picking system 10 is started up, the double-arm manipulator 11 performs an operation of recognizing the assortment boxes B1 on the conveying carriage 12.

First, the double-arm manipulator 11 grips one of the handle bars 61 of the conveying carriage 12 with the support portions 42 of the left hand 35a. The double-arm manipulator 11 rotates the top plate 52 so that one of the empty assortment boxes B1 for reception of the bolts can be moved to a predetermined position.

Then, the double-arm manipulator 11 moves the right hand 35b of the right arm 11b to above one of the assortment boxes B1 placed on the conveying carriage 12 and moves the right hand 35b downwards in that position. If the right hand 35b comes into contact with one of the assortment boxes B1, the output signal of the right force sensor 33b is changed. The position where the change in the output signal occurs can be recognized as the position of the uppermost assortment box B1. The size of the assortment boxes B1 and the height of the top plate 52 are known in advance. Therefore, if the position of the uppermost assortment box B1 is known, it is possible to know the number of the assortment boxes B1 stacked in the corresponding row.

This recognizing operation is repeated with respect to the respective rows. Through the robot controller 22, the system controller 24 is informed of the total number of the assortment boxes B1 and the subtotal of the assortment boxes B1 in each of the rows on the rotary table 51. In this manner, the positions and number of the assortment boxes B1 can be recognized without having to use a dedicated sensor.

(Step S1-2)

The double-arm manipulator 11 grips the handles 56 of one of the assortment boxes B1 with the left hand 35a and the right hand 35b and lifts up the assortment box B1 along the guide poles 54 to a position higher than the tip ends of the guide poles 54. Then, the double-arm manipulator 11 swivels the body 11c and moves the assortment box B1 downwards to place the assortment box B1 on the assortment table 13.

(Step S1-3)

If the load sensor on the assortment table 13 detects the assortment box B1, the system controller 24 determines that the assortment box B1 has been normally placed on the assortment table 13. Then, the next step is performed.

On the other hand, if the load sensor fails to detect the assortment box B1 even when a specified time lapses after the operation of step S1-2, the system controller 24 determines that an abnormality has occurred and performs a predetermined alarming process (e.g., a temporary stop process).

(Step S1-4)

The double-arm manipulator 11 opens the lid 58 by bringing the gripping claws 36 of the left hand 35a into contact with the lower surface of the knob 59 of the lid 58 and moving the lid 58 upwards. The lid 58 is opened at an angle of, e.g., 100 to 140 degrees, from the closed position and is supported by the support member 70.

(Step S1-5)

If the opening/closing sensor on the assortment table 13 detects the opened lid 58, the system controller 24 determines that the lid 58 has been normally opened. Then, the next step is performed.

On the other hand, if the opening/closing sensor fails to detect the opened lid 58 even when a specified time lapses after the operation of step S1-4, the system controller 24 determines that an abnormality has occurred and performs a predetermined alarming process.

(Step S1-6)

The barcode reader reads the two-dimensional barcode attached to the assortment box S1. The information thus read (the first matching information mentioned above) is sent to the system controller 24.

If the first matching information is not received even when a specified time lapses after the operation of step S1-5, the system controller 24 determines that an abnormality has occurred and performs a predetermined alarming process.

(Step S2)

Figure 11:
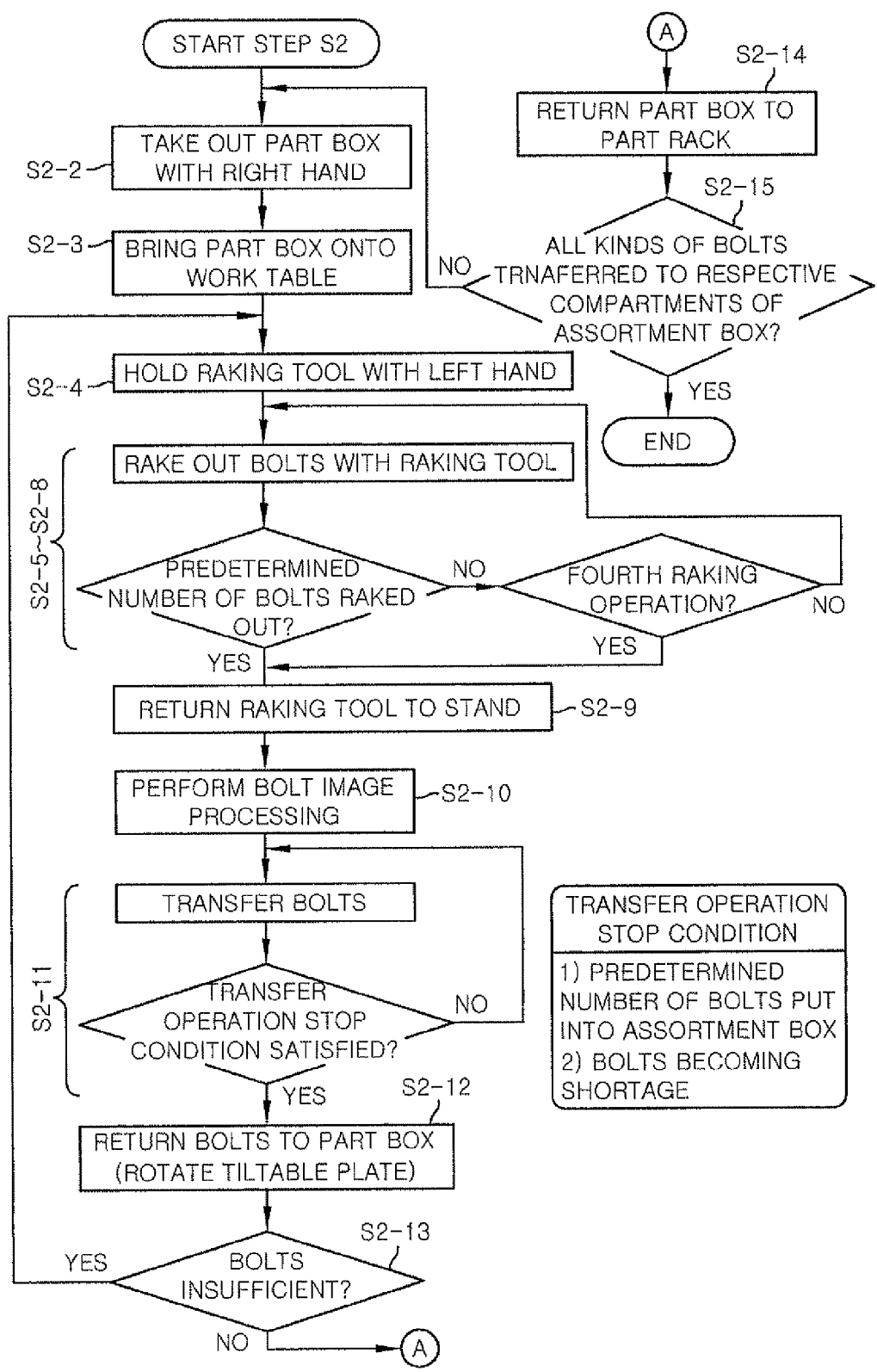
FIG. 11 is a flowchart illustrating major operations of the bolt picking method (step S2) performed by the picking system.

Next, step S2 in which the double-arm manipulator 11 transfers the bolts contained in the workpiece racks 20 to the assortment box B1 placed on the assortment table 13 will be described with reference to FIG. 11 which illustrates only major operations.

(Step S2-1)

Based on the first matching information thus received, the system controller 24 grasps the information on the kind and number of the bolts to be put into the respective compartments of the assortment box B1 on the assortment table 13.

(Step S2-2)

The system controller 24 sends to the robot controller 22 a command "Go to take the workpiece box 52 containing the bolts of the desired kind". Responsive to this command, the robot controller 22 controls the double-arm manipulator 11. Pursuant to a command received from the robot controller 22, the double-arm manipulator 11 swivels the body 11c and takes the workpiece box B2 stored in a predetermined compartment of the workpiece racks 20. More specifically, the double-arm manipulator 11 grips the rear plate 120c of the workpiece box 52 with the gripping claws 44 of the right hand 35b in the vertical direction and takes out the workpiece box B2 toward itself.

Thereafter, the weight of the bolts contained in the workpiece box B2 is measured by the right force sensor 33b. The weight of the workpiece box B2 initially gripped by the double-arm manipulator 11 after the startup of the workpiece picking system 10 is stored in the system controller 24 as an initial weight.

(Step S2-3)

The double-arm manipulator 11 swivels the body 11c to directly face the work table 17. Then, the double-arm manipulator 11 takes down the front end of the gripped workpiece box B2, above the tiltable plate 80 of the work table 17, and holds the workpiece box B2 in a tilted state.

(Step S2-4)

The double-arm manipulator 11 grips the raking tool 15 on the stand 75 with the tool holding members 41 of the left hand 35a.

(Step S2-5)

Using the raking tool 15, the double-arm manipulator 11 performs raking operations by which the bolts contained in the workpiece box B2 are raked out onto the tiltable plate 80 (see FIG. 7). The raking operations will now be described in detail. FIG. 7 schematically shows a situation in which the bolts are raked out by the double-arm manipulator 11. The left hand 35a for gripping the raking tool 15 and the right hand 35b for gripping the workpiece box B2 are omitted in FIG. 7.

Figure 8A:
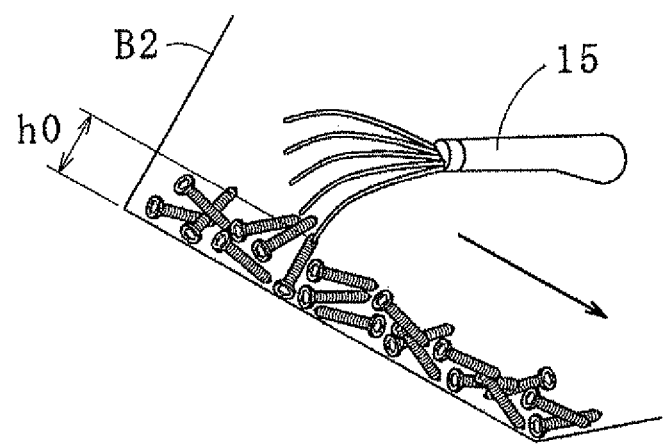
FIGS. 8A and 8B are explanatory views showing a box and a raking tool when the bolts are raked out by the double-arm manipulator of the picking system.

When the double-arm manipulator 11 performs an initial raking operation, the height of the bolts from the bottom surface of the workpiece box B2 is not accurately grasped. Thus, the raking tool 15 is brought into the workpiece box B2 while monitoring the output value of the left force sensor 33a. The position in which the output value of the left force sensor 33a shows a change, i.e., the position in which the raking tool 15 makes contact with the bolts, is assumed to be a reference height h0 from the bottom surface of the workpiece box B2 (see FIG. 8A). The double-arm manipulator 11 brings the raking tool 15 downwards from the reference height h0 by a predetermined depth (e.g., 0.5 to 5 mm) and moves the raking tool 15 forwards, thereby raking out the bolts from the workpiece box B2. The raking force is adjusted depending on the measured value of the left force sensor 33a provided in the left arm 11a.

As will be described later, the bolts on the tiltable plate 80 are imaged by the two-dimensional camera 100 and subjected to image processing. If the bolts overlap with one another, it becomes difficult or impossible to detect the position and posture of the bolts in a two-dimensional image. Accordingly, it is desirable that the raked-out bolts be dispersed on the tiltable plate 80 so as not to overlap with one another. In the present embodiment, the number of bolts required in optimally detecting the position and posture of the bolts from the two-dimensional image is empirically found and set in advance. The pre-set number of bolts are raked out depending on the output value of the left force sensor 33a. This reduces the possibility that the bolts overlap with one another on the tiltable plate 80, consequently increasing the number of bolts of which the position and posture are detected from the two-dimensional image.

As mentioned above, the double-arm manipulator 11 can serve as a workpiece supply unit for raking out the bolts from the workpiece box B2 and supplying the bolts to the work table 17.

(Step S2-6)

After performing the first raking operation, step S2-9 is carried out if it is determined that a predetermined number of bolts have been raked out. The predetermined number of bolts is found pursuant to the output value of the right force sensor 33b. This makes it possible to measure the predetermined number of bolts with no provision of a dedicated sensor, e.g., a weight scale.

Figure 8B:
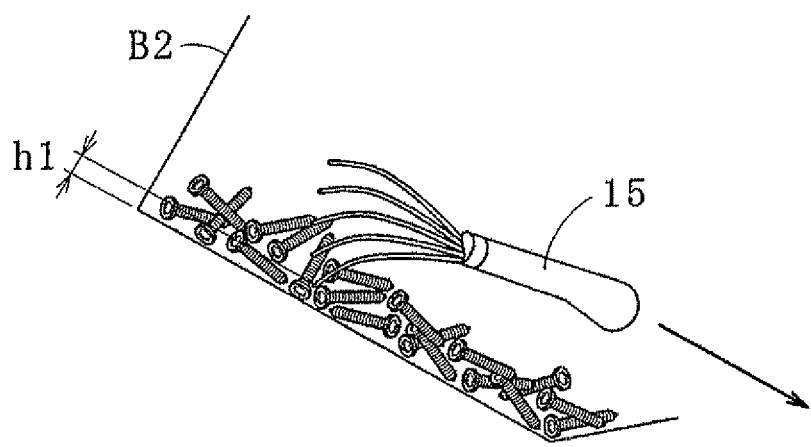

If it is determined that the predetermined number of bolts are not raked out, a second raking operation is performed. In the second raking operation, the raking tool is moved downwards deeper than in the first raking operation (e.g., by a depth of 3 to 10 mm) to rake out the bolts at a height h1 (see FIG. 8B).

(Step S2-7)

After performing the second raking operation, step S2-9 is carried out if it is determined that the predetermined number of bolts have been raked out.

If it is determined that the predetermined number of bolts are not raked out, a third raking operation is performed. In the third raking operation, the raking tool is moved downwards deeper than in the second raking operation (e.g., by a depth of 5 to 15 mm) to rake out the bolts.

(Step S2-8)

After performing the third raking operation, step S2-9 is carried out if it is determined that the predetermined number of bolts have been raked out.

If it is determined that the predetermined number of bolts are not raked out, a fourth raking operation is performed. In the fourth raking operation, the raking tool is moved downwards deeper than in the third raking operation (e.g., by a depth of 7 to 20 mm) to rake out the bolts.

After performing the fourth raking operation, step S2-9 is carried out regardless of whether the predetermined number of bolts have been raked out. While the raking operations are performed four times at most in the present embodiment, the number of raking operations may be set arbitrarily.

(Step S2-9)

The double-arm manipulator 11 returns the raking tool 15 gripped by the left hand 35a to the stand 75.

(Step S2-10)

The bolts of the same kind raked out onto the tiltable plate 80 are imaged by the two-dimensional camera 100 under the control of the system controller 24. The two-dimensional image of the bolts undergoes, e.g., an edge detecting process, in the image processing computer 26. The position and posture of the bolts dispersed on the tiltable plate 80 is found by comparing the detected edges with the templates of bolts stored in advance. The image processing computer 26 recognize workpiece those that have a high degree of correlation than the threshold as qualified workpiece. The robot controller 22 receives the position and posture of the bolts from the system controller 24.

(Step S2-11)

Based on the position and posture of the bolts, the robot controller 22 operates the double-arm manipulator 11 (the gripping claws 36 of the left hand 35a). The double-arm manipulator 11 causes the gripping claws 36 of the left hand 35a to rotate about the picking axis AXp to an orientation in which the gripping claws 36 can grip the bolts with ease. The gripping claws 36 grip one of the bolts on the tiltable plate 80. Pursuant to the first matching information read from the two-dimensional barcode, the double-arm manipulator 11 transfers the gripped bolt to a predetermined compartment within the assortment box B1 (the compartment matched by the first matching information).

This step is repeated as many times as the number of bolts contained in the first matching information so that a predetermined number of bolts of the same kind can be put into the predetermined compartment. During the time when the bolts are transferred by the left hand 35a, the workpiece box B2 gripped by the right hand 35b is temporarily arranged on the workpiece box stand 90 of the work table 17.

If the load sensor of the workpiece box stand 90 indicates that the workpiece box B2 is not arranged on the workpiece box stand 90 even after the lapse of a specified time, the double-arm manipulator 11 is stopped for a while.

This step is repeated until a transfer operation stop condition is satisfied. The transfer operation stop condition includes ① bolts as many as indicated by the two-dimensional barcode having been put into the assortment box B1 or ② the bolts on the tilting top plate 80 becoming shortage in the midst of the transfer operation.

(Step S2-12)

If the transfer operation stop condition is satisfied, the double-arm manipulator 11 grips the tiltable plate 80 with the support portions 42 of the left hand 35a and tilts the tiltable plate 80 about the rotation axis AX4. This returns the bolts on the tiltable plate 80 into the workpiece box 82 placed on the workpiece box stand 90. At this time, the double-arm manipulator 11 presses the workpiece box B2 with the right hand 35b to hold the workpiece box B2 against movement. Since the double-arm manipulator 11 returns the bolts into the workpiece box 82 by tilting the tiltable plate 80, there is no need to provide a dedicated mechanism for returning the bolts to the workpiece box B2.

(Step S2-13)

If bolts as many as indicated by the two-dimensional barcode are put into the assortment box B1 and the transfer operation is stopped (if the transfer operation stop condition ① is satisfied), step S2-14 is carried out. On the other hand, if the bolts on the tilting top plate 80 become shortage in the midst of the transfer operation (if the transfer operation stop condition ② is satisfied), the flow comes back to step S2-4 to repeat the raking operation until the number of bolts put into the assortment box B1 reaches the number of bolts contained in the first matching information.

(Step S2-14)

The double-arm manipulator 11 grips the workpiece box B2 with the right hand 35b and returns the workpiece box B2 to the original workpiece rack 20. After transferring the last bolt to the assortment box B1 and before returning the workpiece box B2 to the original workpiece rack 20, the system controller 24 measures the weight of the bolts remaining in the workpiece box B2 pursuant to the output signal of the right force sensor 33b. Accordingly, it is possible to measure the weight of the bolts remaining in the workpiece box B2 with no provision of a dedicated sensor, e.g., a weight scale.

If the weight of the bolts remaining in the workpiece box B2 is determined to be smaller than a predetermined value, the system controller 24 turns on the relevant lamp of the workpiece racks 20. For example, the system controller 24 turns on the relevant lamp if the weight of the bolts remaining in the workpiece box B2 is equal to or less than 80% of the initial weight stored in step S2-2. This enables the worker to confirm the timing at which the bolts are to be supplemented into the workpiece box B2.

(Step S2-15)

The system controller 24 determines whether all kinds of bolts have been transferred to the respective compartments of the assortment box B1. If yes in step S2-15, step S3 is carried out. If no in step S2-15, the double-arm manipulator 11 repeats steps S2-2 through S2-14 to transfer different kinds of bolts to the assortment box B1.

(Step S3)

Figure 12:
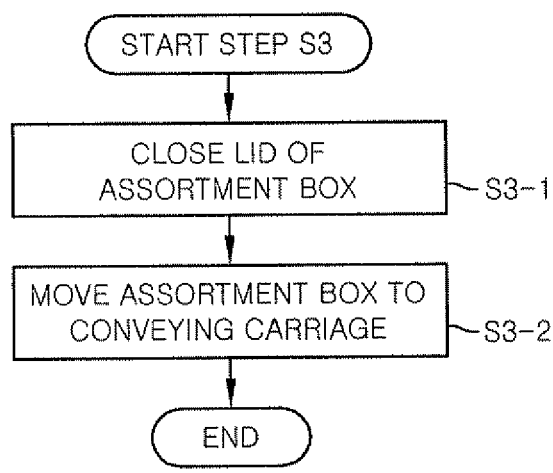

Next, step S3 in which the assortment box B1 holding the bolts is returned by the double-arm manipulator 11 will be described with reference to FIG. 12.

(Step S3-1)

The double-arm manipulator 11 causes the gripping claws 36 of the left hand 35a to face downwards. The double-arm manipulator 11 closes the lid 58 by bringing the gripping claws 36 into contact with the knob 59 of the lid 58 supported on the support member 70 and moving the knob 59 toward itself.

(Step S3-2)

In order to arrange the assortment box B1 in the empty space of the conveying carriage 12, the double-arm manipulator 11 grips one of the handle bars 61 of the conveying carriage 12 with the support portions 42 of the left hand 35a and rotates the top plate 52 of the rotary table 51 into a predetermined position.

The double-arm manipulator 11 grips the handles 56 of the assortment box B1 with the left hand 35a and the right hand 35b and rotates the body 11c toward the conveying carriage 12 while lifting up the assortment box B1. The double-arm manipulator 11 lowers the assortment box B1 along the guide poles 54 and arranges the assortment box B1 on the top plate 52 of the rotary table 51. At this time, if one assortment box B1 holding bolts is already placed in the empty space of the conveying carriage 12, other assortment boxes B1 holding bolts are stacked thereon up to a specified height.

(Step S4)

After finishing step S3-2, the picking system 10 repeats steps S1-2 through S3-2 with respect to all the assortment boxes B1 loaded on the conveying carriage 12 (see FIG. 9).

In the manner described above, the picking system 10 can take out a predetermined number of specific bolts from the workpiece racks 20 using the two-dimensional camera 100 and the double-arm manipulator 11 and can put the bolts into the assortment boxes B1 loaded on the conveying carriage 12. The operations mentioned above may not be performed one after another but may be performed in parallel if possible. The conveying carriage 12 loaded with the assortment boxes B1 holding bolts is carried out through the gateway.

The present invention is not limited to the embodiment described above but may be modified without departing from the scope of the invention. For instance, the foregoing embodiment and other modifications may be combined partly or in their entirety. These combinations shall be construed to fall within the scope of the present invention.

The assortment boxes B1 may be conveyed by a conveyor in place of the conveying carriage 12. The information storage medium is not limited to the two-dimensional barcode but may be, e.g., an IC tag. In this case, an IC tag reader is used in place of the barcode reader. It is apparent that the workpiece s are not limited to the bolts. The workpiece s may be other kinds of workpiece (parts or product), e.g., electronic parts. The left arm 11a or the right arm 11b is not limited to the multi-joint manipulator having seven axes but may be a multi-joint manipulator having more than seven axes. In the foregoing embodiment, the double-arm manipulator 11 serves also as a workpiece supply unit. Alternatively, a workpiece supply unit for supplying parts onto a work table may be provided independently of a manipulator for transferring parts.

What is claimed is:

1. A robot system, comprising:
a manipulator;
a work table arranged within a movement extent of the manipulator;
an imaging unit for taking a two-dimensional image of workpieces loaded on the work table;
a workpiece supply unit for supplying the workpieces onto the work table; and
a control system for controlling operations of the manipulator and the imaging unit, the control system including an imaging control unit for controlling the imaging unit to take the two-dimensional image of the workpieces loaded on the work table when the workpieces are supplied onto the work table by the workpiece supply unit, a workpiece detecting unit for detecting a position and a posture of each of the qualified workpieces loaded on the work table by comparing the two-dimensional image taken by the imaging unit with templates stored in advance, and a manipulator control unit for operating the manipulator to perform a work with respect to the workpieces detected by the workpiece detecting unit,
wherein the manipulator is a double-arm manipulator including a swiveling body and a first and a second arm provided to the body, the double-arm manipulator serving as the workpiece supply unit, and
wherein the system further comprises:
a workpiece rack for storing a plurality of workpiece boxes in which a plurality of workpieces is accommodated on a kind-by-kind basis;
a raking tool for raking out workpieces from the workpiece boxes; and
an assortment table for supporting an assortment box divided into a plurality of compartments,
wherein the double-arm manipulator further includes a first hand provided at a tip end of the first arm through a first force sensor and a second hand provided at a tip end of the second arm through a second force sensor, the first hand having a first gripping unit for gripping one of the workpieces loaded on the work table and a tool holder for holding the raking tool, and the second hand having a second gripping unit for gripping one of the workpiece boxes, and
wherein the double-arm manipulator is configured to perform, with the second gripping unit, an operation of gripping said one of the workpiece boxes and taking out said one of the workpiece boxes from the workpiece rack, to perform, with the raking tool held by the tool holder, an operation of raking out workpieces from said one of the workpiece boxes onto the work table and to perform, with the first gripping unit, an operation of gripping said one of the workpieces on the work table and transferring the gripped workpiece to one of the compartments of the assortment box.

2. The system of claim 1, wherein the work performed by the manipulator is a transfer work in which a predetermined number of workpieces are transferred by the manipulator.

3. The system of claim 2, wherein, if the number of the qualified workpieces detected by the workpiece detecting unit is smaller than the predetermined number, the manipulator control unit repeatedly performs, after finishing the transfer work of transferring the workpieces detected by the workpiece detecting unit, an operation of supplying workpieces onto the work table through the use of the workpiece supply unit and an operation of transferring workpieces detected by the workpiece detecting unit through the use of the imaging control unit and the workpiece detecting unit until the total number of transferred workpieces reaches the predetermined number of workpieces.

4. The system of claim 1, wherein the operation of raking out the workpieces is performed by putting the raking tool into said one of the workpiece boxes, moving the raking tool downwards by a predetermined depth from a position in which the first force sensor shows a change in output value and raking out the workpieces from said one of the workpiece boxes, and
wherein the operation of raking out the workpieces further includes, if a predetermined number of workpieces are not raked out, moving the raking tool downwards by a depth greater than the predetermined depth and raking out more workpieces from said one of the workpiece boxes once again.

5. The system of claim 4, wherein whether the predetermined number of workpieces is raked out or not is determined based on an output value of the second force sensor.

6. The system of claim 1, wherein the assortment table, the work table and the workpiece rack are arranged along a circle about a rotation axis of the body of the double-arm manipulator.

7. The system of claim 1, wherein the assortment box includes an information storage medium storing information on a kind and the number of workpieces to be accommodated in each of the compartments of the assortment box.

8. The system of claim 1, wherein the work table includes a tiltable plate capable of being tilted in one direction, the tiltable plate having a pivot axis at one end portion thereof, and a workpiece box stand provided next to the end portion to support said one of the workpiece boxes.

9. A robot system, comprising:
a manipulator;
a work table arranged within a movement extent of the manipulator;
a raking tool;
a workpiece supply unit configured to supply workpieces onto the work table by raking out the workpieces from a workpiece box onto the work table by using the raking tool, wherein the manipulator is a double-arm manipulator also serving as the workpiece supply unit;
an imaging unit configured to take an image of the workpieces supplied on the work table;
a control system including an imaging control unit configured to control the imaging unit to take the image of the workpieces supplied on the work table, a workpiece detecting unit configured to detect the workpieces supplied on the work table by comparing the image taken by the imaging unit with templates, and a manipulator control unit configured to operate the manipulator to perform a work with respect to the detected workpieces; and
a workpiece rack configured to store a plurality of workpiece boxes in which a multiplicity of workpieces is accommodated on a kind-by-kind basis,
wherein the double-arm manipulator includes a first gripping unit, a tool holder configured to hold the raking tool, and a second gripping unit,
wherein the double-arm manipulator is configured to perform, with the second gripping unit, an operation of gripping one of the workpiece boxes and taking out said one of the workpiece boxes from the workpiece rack, to perform, with the raking tool held by the tool holder, an operation of raking out workpieces from said one of the workpiece boxes onto the work table and to perform, with the first gripping unit, an operation of gripping one of the workpieces raked out onto the work table and transferring the gripped workpiece to a storage unit,
wherein the double-arm manipulator includes a swiveling body and a first and a second arm provided to the swiveling body,
wherein the system further comprises an assortment table configured to support an assortment box divided into a plurality of compartments,
wherein the double-arm manipulator further includes a first hand provided to the first arm through a first force sensor and a second hand provided to the second arm through a second force sensor, the first hand having the first gripping unit and the tool holder and the second hand having the second gripping unit, and
wherein the storage unit is one of the compartments of the assortment box.

10. The system of claim 9, wherein the work performed by the manipulator is a transfer work in which a predetermined number of workpieces are transferred by the manipulator.

11. The system of claim 10, wherein, if the number of the detected workpieces is smaller than the predetermined number, the manipulator control unit repeatedly performs, after finishing transferring the detected workpieces, an operation of supplying one or more workpieces onto the work table through the use of the workpiece supply unit and an operation of transferring workpieces detected by the workpiece detecting unit through the use of the imaging control unit and the workpiece detecting unit until the total number of transferred workpieces reaches the predetermined number.

12. The system of claim 9, wherein the operation of raking out the workpieces is performed by putting the raking tool into said one of the workpiece boxes, moving the raking tool downwards by a predetermined depth from a position in which the first force sensor shows a change in output value and raking out the workpieces from said one of the workpiece boxes,
wherein the operation of raking out the workpieces further includes, if a predetermined number of workpieces are not raked out, moving the raking tool downwards by a depth greater than the predetermined depth and raking out more workpieces from said one of the workpiece boxes once again.

13. The system of claim 12, wherein whether the predetermined number of workpieces is raked out or not is determined based on an output value of the second force sensor.

14. The system of claim 9, wherein the assortment table, the work table and the workpiece rack are arranged along a circle about a rotation axis of the body of the double-arm manipulator.

15. The system of claim 9, wherein the assortment box includes an information storage medium storing information on a kind and the number of workpieces to be accommodated in each of the compartments of the assortment box.

16. The system of claim 9, wherein the work table includes a tiltable plate capable of being tilted in one direction, the tiltable plate having a pivot axis at one end portion thereof, and a workpiece box stand provided next to the end portion to support said one of the workpiece boxes.

* * * * *